United States Patent [19]
Ruetz

[11] Patent Number: 5,463,867
[45] Date of Patent: Nov. 7, 1995

[54] SUPERCHARGED INTERNAL COMBUSTION ENGINE EXHAUST SYSTEM

[75] Inventor: Georg Ruetz, Immenstaad, Germany

[73] Assignee: MTU Motoren-Und Turbinen-Union Friedrichshafen GmbH, Germany

[21] Appl. No.: 355,904

[22] Filed: Dec. 14, 1994

[30] Foreign Application Priority Data

Dec. 14, 1993 [DE] Germany .......................... 43 42 572.0

[51] Int. Cl.⁶ ................................ F01N 5/04; F01N 7/10; F02D 23/00
[52] U.S. Cl. .................................. 60/602; 60/321; 60/323
[58] Field of Search .............................. 60/321, 322, 323, 60/597, 602

[56] References Cited

U.S. PATENT DOCUMENTS

| | | | |
|---|---|---|---|
| 2,660,031 | 11/1953 | Tromel | 60/323 |
| 3,068,638 | 12/1962 | Birmann | 60/323 |
| 4,205,527 | 6/1980 | Rudert et al. | 60/321 |
| 4,658,580 | 4/1987 | Schley et al. | 60/322 |
| 5,305,603 | 4/1994 | Baumann | 60/321 |

*Primary Examiner*—Michael Koczo
*Attorney, Agent, or Firm*—Evenson, McKeown, Edwards & Lenahan

[57] ABSTRACT

An exhaust system for a supercharged internal-combustion engine in which of the exhaust-gas-carrying components, the exhaust gas pipes leading from the cylinder outlets to the turbines, or the turbines, or the turbines and the exhaust gas pipes are arranged jointly in an exhaust-gas-tight housing. Openings in the exhaust-gas-carrying components cause the space formed between the exhaust-gas-carrying components and the housing to be filled with exhaust gas. By way of a bypass pipe which is connected with the space and leads to the turbine, exhaust gas can be blown off from the space. A blow-off valve is arranged in the bypass pipe.

11 Claims, 1 Drawing Sheet

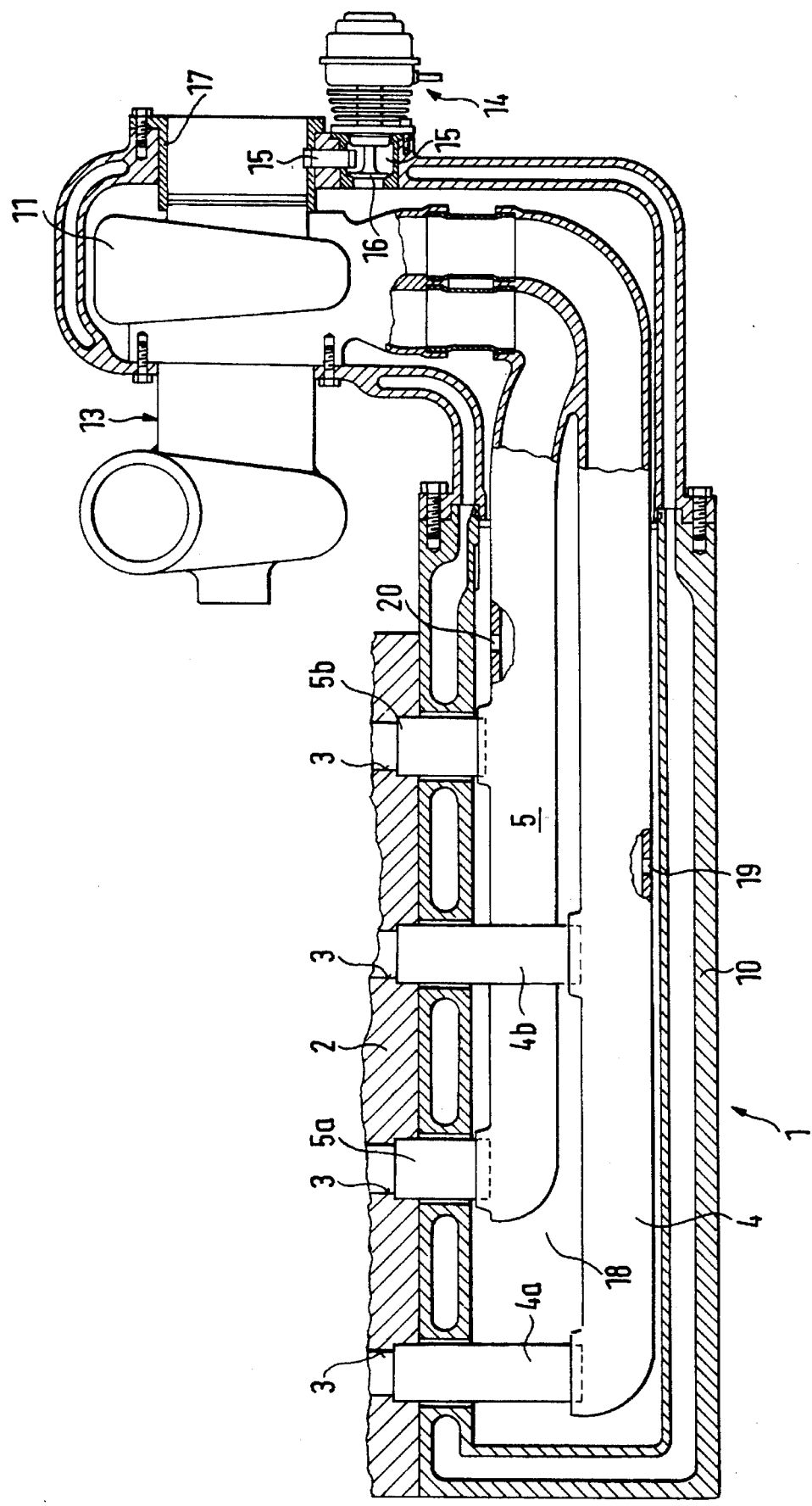

SUPERCHARGED INTERNAL COMBUSTION ENGINE EXHAUST SYSTEM

BACKGROUND AND SUMMARY OF THE INVENTION

In the case of an impact— or shock-type supercharging, it is known to combine the individual engine cylinders of an internal-combustion engine, as a function of the firing sequence, in groups such that the pressure waves can form in an undisturbed manner. In the case of engines with a fairly large number of cylinders, several separate exhaust gas pipes and corresponding connected separate turbine flows of the exhaust gas turbochargers are therefore required so that the pressure impacts or shocks in the exhaust gas pipes can fully develop.

In Swiss Patent CH-PS 627 821, the corresponding exhaust gas pipes are arranged in a gas-tight water-cooled housing. The exhaust gas pipes consist of individual pipe sections which are fitted together by plug-type connections. The plug-type connections are constructed without seals. Exhaust gas which flows out at the leakage points is held back in the space formed by the housing and the exhaust gas pipes. After a corresponding pressure has built up in the space, a further flow-off of exhaust gas from the exhaust gas pipes is prevented.

German Patent DE 36 29 841 A1 also describes an exhaust system for the impact— or shock-type supercharging of an internal-combustion engine. Three cylinders, respectively, of the internal-combustion engine are connected with an exhaust gas pipe which leads to separate turbines of two exhaust gas turbochargers. Upstream of the turbines, bypass pipes branch off the exhaust gas pipes and lead into a common blow-off valve. A common bypass pipe leads from the blow-off valve into a common pipe connected with the outlet connections of the turbines. The blow-off valve permits the leading of the exhaust gas past the turbines. The reason is that in order to achieve a good acceleration behavior of the exhaust gas turbocharger in the case of a partial load, the use of narrow turbine cross-sections is required. This has the result that, in the case of a high load, a portion of the exhaust gases must be led past the turbine in an unutilized manner so that, while the acceleration-optimized construction of the exhaust gas pipes and the exhaust gas turbochargers is maintained, good engine operating values are obtained also in the full-load point. The indicated blow-off valve makes it possible to extend the bypass pipes fluidically separately from one another so that it is ensured that the scavenging operations are not disturbed by pressure impacts or shocks of cylinders which are mowing out at the time.

Also in the internal-combustion engine according to Swiss Patent CH 188 402, the exhaust gases are supplied to a turbine in order to utilize their energy content. To compensate the pressure fluctuations in the exhaust gas pipe leading to the turbine, a compensating space is provided into which a portion of the exhaust gases flows off in the case of each exhaust stroke. However, no blow-off valve is provided. For discharging the impurities depositing from the exhaust gases, however, a valve is mounted which is constantly open during the operation. In addition, the compensation space is provided with a pipe and with a flap situated therein which, however, is opened only when the turbine is switched on and off and is, at any rate, not used for controlling the turbine.

An object of the present invention is to provide a simple device for blowing-off exhaust gas for a multi-walled exhaust system by way of which the impact- or shock-type supercharging is not impaired.

This object has been achieved in accordance with the present invention by providing a bypass pipe which connects a space with the outlet pipe, with a bypass valve arranged in the bypass pipe to control the exhaust gas quantity passing therethrough.

The blowing-off of exhaust gas takes place from the space which is formed between the exhaust-gas-carrying components and the housing. As a result of openings in the exhaust-gas-carrying components, approximately the medium pressure in the space builds up in front of the turbine. Because of the low pressure difference with respect to the pulsating pressure existing in the exhaust-gas-carrying components, the losses in the openings are minimal. That is, the impact— or shock-type supercharging is not disturbed.

When the turbine output is to be reduced for limiting the charge pressure, the pressure in the space is lowered by the opening of the blow-off valve. As a result of the pressure difference, a blowing-off of exhaust gas is achieved. In the case of this exhaust system, the exhaust gas pipes leading to the turbines are arranged only inside the housing. However, only the turbines or the exhaust gas pipes leading to the turbines as well as the turbines can also be arranged in the housing.

It is advantageous to arrange the blow-off valve in the direct proximity of the outlet of the turbines in the housing, whereby long by-pass pipes are avoided. If the exhaust-gas-carrying components, particularly the exhaust gas pipes, are constructed with plug-type connections, exhaust gas may flow out from the exhaust gas pipes by way of leakage points into in the plug-type connections into the space.

It may also be advantageous to provide special bores which may be used as exhaust gas transfer points. The bores in the two exhaust gas pipes are to be arranged such that the impact— or shock-type supercharging is not disturbed. This can take place by arranging the bores to face away from one another or they can be disposed far apart from one another.

It is a particular advantage for the bores to be situated in direct proximity of the outlet to the bypass pipe because then the exhaust gas quantity to be blown off will enter the bypass pipe directly without causing any strong flow movements in the more remote areas of the space. Strong flow movements are undesirable because, as a result more heat is transferred into the cooled housing and the energy content of the exhaust gas flow is therefore reduced.

BRIEF DESCRIPTION OF THE DRAWING

These and other objects, features and advantages of the present invention will become more readily apparent from the following detailed description thereof when taken in conjunction with the accompanying drawing which consists of a single FIGURE showing a longitudinal section of an exhaust system, in which the multiflow turbine and the exhaust gas pipes leading thereto are arranged inside a cooled housing in accordance with the present invention.

DETAILED DESCRIPTION OF THE DRAWING

In the illustrated exhaust system designated generally by the numeral 1, the cylinder-outlets 3 of two cylinders of an internal-combustion engine are connected to respective separate exhaust gas pipes 4, 5. Of course, according to the type of engine, three or four cylinders of an internal-combustion engine may also be combined in groups. However, the exhaust gas pipes must in each case connect only those cylinders with one another which do not exhaust simultaneously or whose outlet valve opening times overlap only a little. In the illustrated embodiment of the present invention, the exhaust gas pipes 4, 5 are connected with different flows of a double-flow turbine 11 of an exhaust gas turbocharger 13. As required, the turbine 11 may also be constructed with more than two flows, or several single-flow or multiflow turbines may be used.

The exhaust gas pipes 4, 5 and the connecting pipes 4a, 4b, 5a, 5b, which transfer the exhaust gas from the cylinder outlets 3 of the cylinder head 2 into the exhaust gas pipes, are arranged, like the turbine 11, inside a water-cooled housing 10. The space 18 between the exhaust gas pipes 4, 5 and the housing 10 has an insulating effect. An exhaust system of this type with the arrangement of corresponding exhaust-gas-carrying components inside a water-cooled housing 10 has the purpose of protecting the hot exhaust gases from a loss of energy by heat radiation and convection, and of keeping the outside-wall temperature of the exhaust system low.

Because the housing 10 mounted on the cylinder head 2 has an exhaust-gas-tight construction, the further advantage is achieved that the exhaust gas pipes may be constructed without any special sealing devices. The exhaust gas pipes 4, 5 and the connecting pipes 4a, 4b, 5a, 5b may be formed, for example, by pipe sections which are fitted into one another. Exhaust gas may flow out into the space 18 via the leakage points in the plug-type connections. A pressure builds up in space 18 which corresponds approximately to the medium pressure of the exhaust gas in front of the turbine 11. Because of the slight pressure difference, the impact— or shock-type supercharging will not be disturbed. When, for limiting the charge pressure, the turbine output must be reduced, the pressure in the space 18 is lowered. For this purpose, the space 18 is connected, by way of a bypass pipe 15, with the outlet pipe 17 which connects to the outlet connection of the turbine 11.

In the partial-load area, the blocking element 16 of the blow-off valve 14 is controlled, for example, as a function of the charge air pressure and blocks the bypass pipe 15. Only when the load is higher and when the increased amount of offered exhaust gas can no longer be taken in by the turbine, the blow-off valve 14 will open the bypass pipe 15. As the result of the falling pressure in the space 18, an exhaust gas flow will escape by way of the openings in the exhaust gas pipes which, while bypassing the turbine by way of the bypass pipe 15, will arrive in the outlet pipe 17 of the turbine 11. In order to keep the bypass pipe 15 short, it is particularly advantageous for the blow-off valve 14 to be arranged directly in the area of the outlet pipe 17. The bypass pipe 15 can, for example, consist of ducts in the walls of the housing 10 as illustrated in the sole FIGURE.

The openings in the exhaust gas pipes for the exhaust gas transfer into the space 18 may also be represented by bores in the exhaust gas pipes. Care is taken in this situation that the bores 19, 20 are arranged such that they do not interfere with the impact— or shock-type supercharging during the operation without any blow-off. They may, for example, be arranged to face away from one another so that the flowing-out gas flow is not directed against the respective other bore. The bores may also be arranged to be situated far apart from one another. It is especially advantageous for the bores 19, 20 to be arranged in the direct proximity of the outlet to the bypass pipe 15. The amount of exhaust gas to be blown off will then escape directly into the bypass pipe 15 without setting the exhaust gas in slightly more remote areas of the space into an excessive motion during the blow-off. Flow movements of the exhaust gas in the space increase the heat transfer to the cooled housing which, however, would undesirably reduce the energy content of the exhaust gas.

According to another embodiment within the scope of the present invention, the exhaust gas turbine can also be situated outside the cooled housing 10. Furthermore, the turbines can be arranged in a separate cooled housing which is separated from the exhaust gas pipes and in which case the bypass pipe 15 leads from the space enclosed by this housing to the outlet pipe 17.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An exhaust system for a supercharged internal-combustion engine, comprising exhaust gas pipes each connecting a group of cylinders of the internal-combustion engine with a flow of one of a single-flow and multiflow turbine of an exhaust gas turbocharger, exhaust-gas-carrying components arranged in a gas-tight housing, and provided with openings to permit exhaust gas to reach a space between the exhaust-gas-carrying components and the housing, an outlet pipe arranged to discharge the exhaust gas flowing away from the turbine, a bypass pipe is arranged to connect the space with the outlet pipe, and a blow-off valve is arranged at the bypass pipe to control a quantity of the exhaust gas passing through the bypass pipe.

2. The exhaust system according to claim 1, wherein the exhaust gas components-which consist of connecting pipes, as well as the exhaust gas pipes, are arranged in the housing.

3. The exhaust system according to claim 1, wherein the turbine is arranged inside the housing.

4. The exhaust system according to claim 1, wherein the exhaust gas pipes and the turbine, are arranged in the housing.

5. The exhaust system according to claim 1, wherein the blow-off valve is arranged proximate the outlet pipe.

6. The exhaust system according to claim 1, wherein the exhaust-gas-carrying components constitute pipe sections constructed of plug-type connections.

7. The exhaust system according to claim 1, wherein bores are provided in the exhaust-gas-carrying components for exhaust gas transfer into the space.

8. The exhaust system according to claim 7, wherein the bores face away from one another.

9. The exhaust system according to claim 7, wherein the bores are spaced remote from one another.

10. The exhaust system according to claim 7, wherein the bores are proximate an outlet to the bypass pipe.

11. The exhaust system according to claim 8, wherein the bores are proximate an outlet to the bypass pipe.

* * * * *